(No Model.) 2 Sheets—Sheet 1.
F. R. WINTERS.
GATE.
No. 547,313. Patented Oct. 1, 1895.
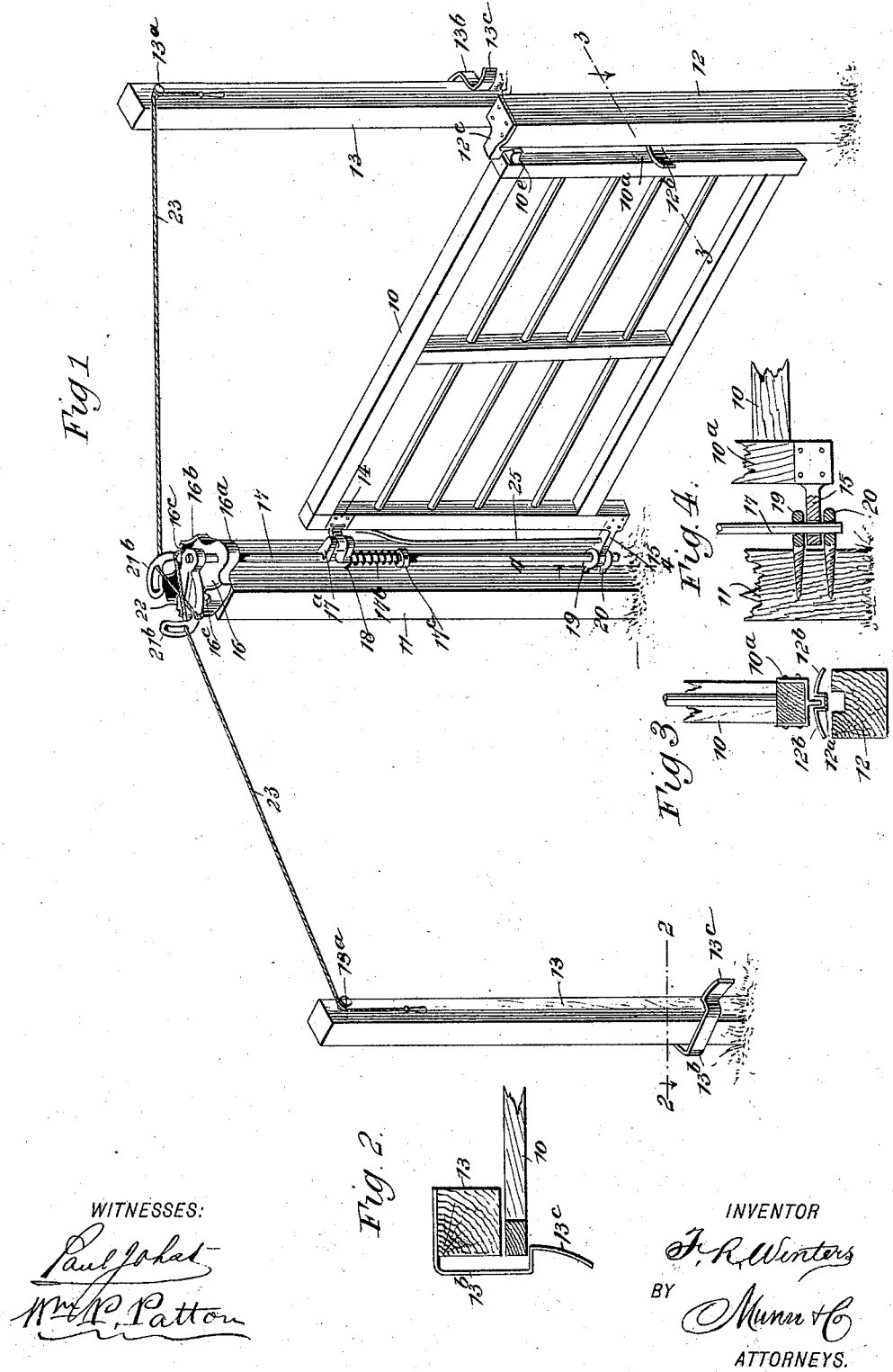
WITNESSES:
Paul Johat
Wm P. Patton
INVENTOR
F. R. Winters
BY
Munn & Co
ATTORNEYS.

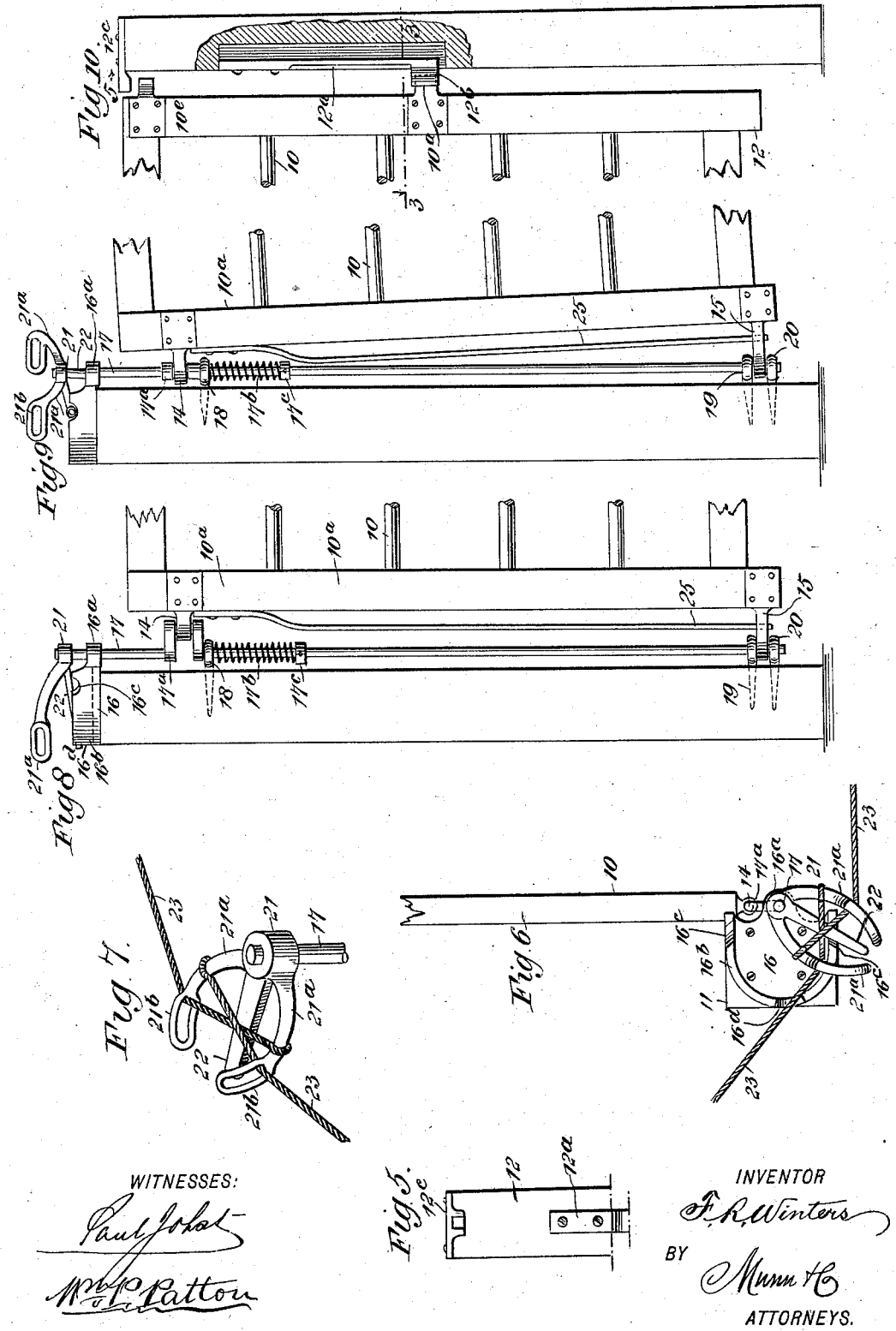

UNITED STATES PATENT OFFICE.

FRANKLIN R. WINTERS, OF TULSA, INDIAN TERRITORY.

GATE.

SPECIFICATION forming part of Letters Patent No. 547,313, dated October 1, 1895.

Application filed February 11, 1895. Serial No. 538,064. (No model.)

*To all whom it may concern:*

Be it known that I, FRANKLIN R. WINTERS, of Tulsa, Creek Nation, Indian Territory, have invented a new and Improved Gate, of which the following is a full, clear, and exact description.

This invention relates to improvements in gates of a class known as "swinging" and "self-closing" gates, and has for its object to provide a gate of the type indicated which is especially well adapted for use to guard a private roadway or a passage through a fence into a field or other inclosure, and which will be easy and convenient to operate either by manipulation while the operator is on foot or in a vehicle which is drawn along the road where the improved gate is situated.

A further object of the invention is to provide a gate of the type mentioned which will be adapted to resist the encroachments of hogs or other animals that may strive to lift the gate and thus release its latch while in a closed condition; and a further object is to produce a farm-gate which is light, strong, simple in construction, and which can be produced at a moderate cost.

To these ends my invention consists in the construction and combination of parts, as is hereinafter described and claimed.

Reference is to be had to the accompanying drawings, forming a part of this specification, in which similar figures of reference indicate corresponding parts in all the views.

Figure 1 is a perspective view of the improved gate in closed adjustment. Fig. 2 is an enlarged sectional plan view on the line 2 2 in Fig. 1, showing a gate-latching device preferably used to retain the gate in open adjustment. Fig. 3 is a sectional plan view on the line 3 3 in Figs. 1 and 10, indicating an improved latching device for holding the gate closed. Fig. 4 is an enlarged partly-sectional side view of the lower portion of the gate and its lower supports, taken substantially on the line 4 4 in Fig. 1. Fig. 5 is a side view of the upper part of a latching-post for the gate which is engaged when the gate is closed, the view being taken in direction of the arrow 5 in Fig. 10. Fig. 6 is a partial plan view of the gate and the post whereon said gate is hung, also showing operative mechanism for swinging the gate, the latter appearing in open adjustment. Fig. 7 is an enlarged detached perspective view of one portion of the gate-operating mechanism. Fig. 8 is a side view of an end portion of the gate, its supporting-post and the hinged connections between the gate and post, which are likewise portions of the gate-swinging mechanism. Fig. 9 is a side view of the gate, its supporting-post, and the connecting mechanism between the gate and post, showing their relative positions when adjusted to release the gate from the latching-post and permit it to swing open; and Fig. 10 is a side view of the gate-latching post, an end portion of the gate, a latching device for connecting said gate and post to retain said gate closed, and a keeper device for preventing the gate being lifted, when closed, by animals trying to open it.

The gate 10 may be made of any suitable material and may be either imperforate or made slatted, substantially as shown, the latter being preferable on account of ligntness, while necessary strength and rigidity are afforded.

When the improvements are to be employed for the support and movement of a comparatively large gate to guard a private roadway or passage into an inclosure, there is a main post 11 provided, which is designed to afford support for the gate, a latching-post 12, that is located at the opposite side of a road which the gate is to guard, and whereon the gate is latched when said roadway is to be closed, and two similar hold-open posts 13, to either of which the gate may be latched for its open adjustment. The length of the gate is so proportioned to the space between the posts 11 and 12 that room will be afforded for the introduction of a latching device between the free upright edge of the gate and post 12 and also permit the location and proper operation of the novel hinging and gate-operating mechanism which will presently be described.

The hinges for the gate are preferably constructed as shown, and consist in part of an upper ear 14, adapted for attachment to the upright bar of the gate and a longer ear 15, constructed for fixture upon said bar near its lower end.

On the upper end of the main post 11 a peculiarly-shaped bracket-plate 16 is secured in operative position, a detailed description of which will presently be given, and from said plate a vertically-perforated boss 16$^a$ is laterally projected at the side of the main post, which faces the gate-edge from which the ears 14 and 15 project. The boss 16$^a$ is loosely engaged by the upper portion of the upright rock-shaft 17, the said shaft being adapted to serve as a pintle-rod for the hinged connection of the gate and main post 11, and to this end it is extended far enough downward to permit its loose engagement with the lower ear 15, through which it passes, as is clearly represented in Figs. 1, 8, and 9. At a point opposite the upper and shorter ear 14 a double crank 17$^a$ is formed on or secured to the shaft 17, and the connecting-pin of said double crank has a loose engagement with the ear 14. The rock-shaft 17 is loosely connected with the main post 11 by three staples or screw-eyebolts 18 19 20, the eyebolt 18 being located on the shaft immediately below the double crank 17$^a$ and screwed into the post. The other bolts 19 and 20 are inserted into the post 11 at points near each other and in the same vertical plane with the upper eyebolt 18, their relative positions being such as will allow the lower ear 15 to be located between them, which will effect a hinged connection of the gate 10 with the main post when the shaft 17 is introduced through the eyebolts and ears, as represented in Figs. 8 and 9.

For effective service the throw of the double crank 17$^a$ and length of the upper ear 14, taken together, should equal the length of the lower ear 15 from the center of the rock-shaft to the point of junction of the ear with the gate 10, the screw-eyebolts all having an equal degree of projection from the main post 11, so that when the rock-shaft is adjusted to project the double crank 17$^a$ at right angles to the front face of the main post, as shown in Figs. 1 and 8, the gate will be sustained with its rear upright edge about parallel with the front face or side of the post it is hung on.

The bracket-plate 16 is formed with an upwardly-projecting flange near its border, which flange 16$^b$ is preferably formed substantially as represented in Figs. 6, 8, and 9, it being curved from points near the projecting boss 16$^a$, and has its upper edge notched at three points. Two notches 16$^c$ are produced in the edge of the border-flange 16$^b$ near to and about equally distant from the boss 16$^a$, and the other notch 16$^d$, which is intermediate of the side notches, lies directly opposite said boss. A duplex rock-arm 21 is secured on the upper end of the rock-shaft 17, said arm being composed of two similar limbs 21$^a$, that are preferably curved laterally, so as to form arch-pieces that occupy the same horizontal plane and approach each other at their free ends, both projecting from a hub wherein the rock-shaft is affixed.

The duplex rock-arm 21 has a locking limb 22 projected from its hub between the limbs 21$^a$, and the latter have elongated eye-holes 21$^b$ formed in them near their free ends, as clearly shown in Figs. 1, 7, 8, and 9.

The rock-arm 21 is designed to afford convenient and reliable means for operating the gate, which in service is to be released and swung toward either post 13, and to this end the wire ropes 23, or other flexible connections, are each attached by one end to one of the limbs 21$^a$, and thence extended through the eye-hole 21$^b$ of the opposite limb, from which the said rope is projected to have a loose engagement with a screw-eyebolt 13$^a$ on one of the posts 13, as shown in Fig. 1, the free ends of the ropes 23 being allowed to hang pendent from said screw-eyebolts for convenient manipulation.

The locking-limb 22 is adapted to rest in either notch 16$^c$ 16$^d$ when one of the ropes 23 is drawn upon to insure an interlocking engagement of the limb with any one of the notches in plate 16. A spiral spring 17$^b$ is mounted on the rock-shaft 17, and presses at its lower end against a collar 17$^c$, that is fastened on a shaft, and at its upper end on the upper screw-eyebolt 18, as clearly indicated in Figs. 1, 8, and 9.

The preferred means for securing the gate 10 in closed position, or in connection with the latching-post 12, consists of a spring-plate 12$^a$, that is secured in an upright recess formed in the face of the post nearest to the free upright edge of the gate, as shown in Fig. 10, said spring-plate having two spaced and curved spring-jaws 12$^b$ formed on its end portion, which is free to vibrate toward or from the gate-edge.

On the gate 10, opposite the spring-jaws 12$^b$, a latch toe-piece 10$^a$ is secured to project opposite and toward the latch-plate 12$^a$, and said toe-piece is adapted to press back the latch-plate by impinging on either of the convexed curved spring-jaws 12$^b$ and loosely occupying the space between said jaws, as clearly represented in Fig. 3, the momentum and weight of the swinging gate being sufficient to effect a latched connection of the toe-piece 10$^a$ and latch-plate 12$^a$. A spring-catch 13$^b$ is secured on each post 13, preferably near the ground, so as to be convenient for release, and said catches each consist of a resilient plate of metal bent into L form, as shown in Fig. 2, so that one part of the catch-piece may be secured on the post, at the rear face of said post.

The spring-body of the catch-piece 13$^b$ projects away from the side of the post and then toward the front side of the latter, the free part of the catch being bent so as to produce a hook-like detent 13$^c$ on it, having a curved end portion on which the gate edge will impinge and spring the catch sufficiently to allow the latter to receive and loosely contact with the upright end bar of the gate, as clearly shown in Fig. 2.

The operation is as follows: Assuming that the gate is in closed adjustment or is latched fast to post 12, the operator pulls on either of the ropes 23, which will rock the shaft 17 so as to release the locking-limb 22 from the center notch 16$^d$ and move the double crank 17ª around toward the side of the main post 11. The movement of the double crank, as stated, shortens the distance between the upper portion of the hinged gate and the main post, which will elevate the free end of the gate and at the same time laterally incline it toward the post 13 approached by the gate. This elevation and inclination of the gate will lift the toe-piece from between the spring-jaws 12ᵇ, and the side pressure of the double crank 17ª on the upper ear 14 will give an impetus to the gate which will cause it to swing with such force toward the hold-open post 13 as will effect a latched engagement of the gate with the latch-piece on said post; and it will be evident that the operation will be the same when either rope 23 is pulled, the gate always moving from the operator so as to open it. The limb 22 engages with either notch 16ᶜ when the gate is fully opened. After a person has passed through the opening afforded by operating the gate as described, the gate may be closed by pulling the rope on the hold-open post 13 that has been approached, as this will rock the shaft 17 so as to move the double crank 17ª outwardly from the main post 11 and instantly lift the free edge of the gate above the catch that has retained it on the post 13, the continuation of draft on the rope causing the swinging movement of the gate toward and its latched engagement with the post 12, as before explained. It is essential to prevent animals from lifting the gate at its latched edge for release of the same, and the preferred means for effecting this comprises a detent-lug 10ᵉ, that projects from the free end of the gate below the keeper-plate 12ᶜ, which is secured on the post 12, so as to project toward the upright gate-bar when the gate is closed. It will be seen that if a hog or other animal attempts to open the gate by a lifting movement of the same, the lug 10ᵉ will be brought into contact with the keeper-plate before the latch will be released; but this device will not interfere with the release of the gate when draft is applied to either of the ropes 23, as the rocking of the double crank 17ª serves to pitch the gate sidewise sufficiently to clear the keeper-plate at the time the gate is lifted, and therefore removes the lug 10ᵉ from below the keeper-plate, so as to permit a free action of the gate. It should also be explained that when the gate is operated to close it the double crank 17ª will be extended, as shown in Figs. 1 and 8, when the gate is near to the post 12, which will permit the lug 10ᵉ to move below the keeper-plate on post 12 and the gate freely to latch fast on said post. A brace-rod 25 may be provided to stiffen the lower ear 15, the rod being extended from the gate and attached to the ear, as shown in Figs. 1, 8, and 9, and said rod will also serve to strengthen the gate, if used.

It will be evident from the foregoing description, that the improved gate is adapted for free lateral movement by a slight manual effort to open or close it, its own weight being mainly conducive to such a result.

The working parts of the gate-operating mechanism are strong, simple, and cheap to construct, and from their shape and arrangement avoid liability to derangement or the need of frequent repair.

Having thus described my invention, I claim as new and desire to secure by Letters Patent—

1. The combination, with a gate, a main post, a bracket plate on said post having a flange notched at three points, and a latching post having a spring catch adapted to interlock with a latch toe on the gate, of a rock shaft loosely secured upright on the main post and having a double crank near its upper end, a hinge ear on the gate loosely engaging the double crank, a longer hinge ear near the lower edge of the gate and loosely engaging the rock shaft, a duplex rock arm having a locking limb that is adapted to enter either of the notches in the flange of the bracket plate, and two flexible connections attached at their ends to the limbs of the rock arm and adapted when pulled, to rock said arm, substantially as described.

2. In a gate-operating mechanism, substantially as described, the rock shaft having the double crank hinged to the gate, the duplex rock arm on said rock shaft having a locking limb projected intermediately of the duplex limbs, and the bracket plate having the triple notched flange, which plate is adapted to receive the locking limb in either of the notches of its flange, substantially as described.

3. In a gate, the combination of a main post having a bracket plate provided with notches, a rock shaft journaled on said post and provided with a rock arm having limbs projecting from its opposite sides and provided with a central locking limb to engage the respective notches of the bracket plate, a spring connected to said rock shaft and adapted to move the same to cause said locking limb to engage said notches, a gate pivoted on the main post and connected to said rock shaft, and flexible connections attached to the limbs of the rock arm, substantially as set forth.

FRANKLIN R. WINTERS.

Witnesses:
JAMES A. MOORE,
WILLIAM P. MOORE.